United States Patent
Hayasaka et al.

(10) Patent No.: US 6,649,082 B2
(45) Date of Patent: Nov. 18, 2003

(54) HARM-REMOVING AGENT AND METHOD FOR RENDERING HALOGEN-CONTAINING GAS HARMLESS AND USES THEREOF

(75) Inventors: Yuji Hayasaka, Kawasaki (JP); Hitoshi Atobe, Kawasaki (JP); Yoshio Furuse, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 128 days.

(21) Appl. No.: 10/030,248

(22) PCT Filed: May 24, 2001

(86) PCT No.: PCT/JP01/04364

§ 371 (c)(1),
(2), (4) Date: Jan. 9, 2002

(87) PCT Pub. No.: WO01/89666

PCT Pub. Date: Nov. 29, 2001

(65) Prior Publication Data

US 2003/0082918 A1 May 1, 2003

Related U.S. Application Data

(60) Provisional application No. 60/216,516, filed on Jul. 6, 2000.

(30) Foreign Application Priority Data

May 26, 2000 (JP) ........................................ 2000-156236

(51) Int. Cl.⁷ .............................................. H01L 21/00
(52) U.S. Cl. .................... 252/79.1; 216/58; 438/706; 438/710
(58) Field of Search ...................... 252/79.1; 438/706, 438/710, 718, 719, 720, 723, 724, 745; 216/58, 67, 77, 79; 134/31

(56) References Cited

U.S. PATENT DOCUMENTS

| 5,118,492 A | 6/1992 | Okazaki et al. |
| 5,755,977 A | 5/1998 | Gurol et al. |

FOREIGN PATENT DOCUMENTS

| EP | 0 483 587 A1 | 5/1992 |
| EP | 0 673 669 A2 | 9/1995 |
| EP | 0 702 078 A1 | 3/1996 |
| EP | 1 066 873 A1 | 1/2001 |
| JP | 6 198128 A | 7/1994 |
| JP | 6 319947 A | 11/1994 |

OTHER PUBLICATIONS

Database WPI, Section Ch, Week 199221, Derwent Publications Ltd., London, GB, & JP 04 110035 A, Apr. 10, 1992.

Primary Examiner—William A. Powell
(74) Attorney, Agent, or Firm—Sughrue Mion, PLLC

(57) ABSTRACT

The present invention intends to provide an agent and a method for removing harmful gas, which exhibits high harm-removing ability per unit volume for harmful halogen-containing gas contained in the exhaust gas from the etching or cleaning step in the manufacturing process of a semiconductor device, and which is inexpensive.

The invention is characterized by that halogen-containing gas is removed using a harm-removing agent comprising a specific iron oxide, an alkaline earth metal compound and activated carbon in the specific amount. In the case where the exhaust gas contains halogen gas such as chlorine or a gas such as sulfur dioxide, the gas is rendered harmless by using in combination a harm-removing agent comprising activated carbon or zeolite.

22 Claims, 2 Drawing Sheets

HARM-REMOVING AGENT AND METHOD FOR RENDERING HALOGEN-CONTAINING GAS HARMLESS AND USES THEREOF

CROSS REFERENCE TO RELATED APPLICATION

This application is an application filed under 35 U.S.C. §111(a) claiming benefit pursuant to 35 U.S.C. §119(e) of the filing date of U.S. Provisional Application No. 60/216,516 filed on Jul. 6, 2000, pursuant to 35 U.S.C. §111 (b).

DETAILED DESCRIPTION OF THE INVENTION

1. Technical Field

The present invention relates to a harm-removing agent and a method for rendering halogen-containing gas harmless, which can render harmless the exhaust gas containing halogen-containing gas discharged from a dry etching or cleaning step in a manufacturing process of a semiconductor device, and also relates to a method for manufacturing a semiconductor device using them.

2. Background Art

At the dry etching in the manufacturing process of a semiconductor device, a material subjected to the etching, such as $SiO_2$, Si, SiW, SiN, Al, GaAs, GaP and InP, is etched using, for example, one or more gas selected from fluorocarbon-type gas, sulfur hexafluoride, hydrogen halide (e.g., hydrogen chloride), boron trichloride and halogen gas (e.g., chlorine gas), and according to the purpose, one or more gas selected from oxygen, nitrogen, hydrogen, argon and helium is added to the etching gas. The exhaust gas discharged from the etching apparatus contains gases produced during the etching in addition to the etching gas, such as silicon halide, tungsten halide, carbonyl halide, sulfur tetrafluoride and sulfur dioxide.

As the means for rendering harmless the exhaust gas containing such halogen-containing gas discharged from the manufacturing process of a semiconductor device, a wet process and a dry process are heretofore known. The wet process requires complicated equipment and has a problem in the after-treatment of the absorbing solution or in the operability. Furthermore, since the exhaust gas is washed with an aqueous solution of alkali such as sodium hydroxide or sodium carbonate, the halogen-containing gas may react with the alkali aqueous solution depending on the case to produce solid matters and therefore the gas outlet line of the treating apparatus may be clogged. Because of these problems, the wet process is not applied widely.

On the other hand, the dry process is expected to have capability of easily improving the problems of the wet process and a large number of agents and methods for removing harmful gas have been proposed.

Examples of the methods include:

(1) a method of using a harm-removing agent obtained by attaching triiron tetroxide to the surface of soda lime (see, JP-A-6-2213 (the "JP-A" as used herein means an "unexamined published Japanese patent application")), (2) a method of contacting the gas with activated carbon and then with iron oxide (see, JP-A-6-319947), (3) a harm-removing agent mainly comprising iron oxide and a manganese compound and a method of contacting the gas with the harm-removing agent, and then contacting the gas with activated carbon having supported thereon a metal oxide (see, JP-A-6-198128), (4) a method of using a harm-removing agent mainly comprising strontium hydroxide and a harm-removing agent containing water moreover (see, JP-A-7-275645), (5) a method of using a harm-removing agent mainly comprising triiron tetroxide and a harm-removing agent containing water moreover (see, JP-A-7-275646), and (6) a method of using a harm-removing agent comprising activated carbon having supported thereon an aluminate of alkali metal or tetraalkylammonium (see, JP-A-4-210236).

In any of these methods, the dry etching exhaust gas containing halogen-containing gas is rendered harmless generally by a harm-removing agent using an iron oxide, an alkali metal compound or a alkaline earth metal compound, and an activated carbon or an activated carbon having supported thereon an effective components.

Among these, in the case of the harm-removing agent of (6), the harm-removing ability for chlorine, boron trichloride and the like is equal to, for example, that of activated carbon but the harm-removing ability for hydrogen halide, silicon fluoride and the like is higher. However, when halogen-containing gas in the dry etching exhaust gas is actually treated, the harm-removing ability decreases in many cases including the methods of (1) to (5) and the harm-removing agent must be frequently exchanged, as a result, the cost for the treatment of dry etching exhaust gas increases.

The main factor of causing the decreasing of the harm-removing ability is in the water washing of the etching chamber. More specifically, the washing of the etching chamber is very important to prevent the generation of particles due to the deposit produced during the etching or to prevent corrosion by the halogen-containing gas. In almost all of the methods for washing the chamber employed by the manufacturers of semiconductor device, water is used as the most effective washing agent. When the aluminum, tungsten silicide, silicon oxide film, gallium arsenide, indium phosphide, gallium phosphide or the like is etched using halogen-containing gas such as hydrogen halide, boron trichloride or chlorine gas, the etching gas and many halogen-containing gases produced during the etching contained in the exhaust gas react with the washing water as follows to produce hydrogen halide:

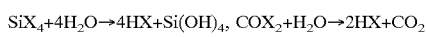
$SiX_4 + 4H_2O \rightarrow 4HX + Si(OH)_4$, $COX_2 + H_2O \rightarrow 2HX + CO_2$ (X: F, Cl, Br)

$BCl_3 + 3H_2O \rightarrow 3HCl + H_3BO_3$, $SF_4 + 2H_2O \rightarrow 4HF + SO_2$ In such a situation, the agent for rendering halogen-containing gas harmless in the dry etching exhaust gas must be, as a mandatory requirement, a harm-removing agent particularly having high harm-removing ability for hydrogen halide produced by the hydrolysis reaction. The harm-removing agent is also required to be effective for other halogen-containing gases. However, the techniques at present have not yet succeeded in providing an agent and a method capable of rendering halogen-containing gas harmless contained in the dry etching exhaust gas at the low cost while revealing high harm-removing ability (per unit volume), and the development thereof is demanded from many manufacturers of semiconductor device.

PROBLEMS TO BE SOLVED BY THE INVENTION

The present invention has been made under these circumstances and the object of the present invention is to provide an agent and a method for removing harmful gas, favored with high harm-removing ability per unit volume for halogen-containing gas contained in the etching or cleaning exhaust gas and also favored with inexpensiveness.

DISCLOSURE OF INVENTION

As a result of extensive investigations to solve the above-described problems, the present inventors have found that a harm-removing agent containing the specific iron oxide, an alkaline earth metal compound and activated carbon in the specific amount exhibits high harm-removing ability particularly for hydrogen halide and by this, the problems described above can be solved. The present invention has been accomplished based on this finding. The present invention provides an agent and a method for rendering halogen-containing gas harmless and a method for manufacturing a semiconductor device using them, as described in the following (1) to (22).

(1) A harm-removing agent for rendering halogen-containing gas harmless, comprising 10 to 40 wt % of an iron oxide selected from the group consisting of γ-iron oxide hydroxide and γ-ferric oxide, 20 to 80 wt % of an alkaline earth metal compound and 10 to 40 wt % of an activated carbon.

(2) The harm-removing agent for rendering halogen-containing gas harmless as described in (1) above, wherein said alkaline earth metal compound is at least one selected from the group consisting of oxides, hydroxides and carbonates of magnesium, calcium, strontium and barium.

(3) The harm-removing agent for rendering halogen-containing gas harmless as described in (1) or (2) above, wherein said activated carbon has a specific surface area of 500 m$^2$/g and more.

(4) The harm-removing agent for rendering halogen-containing gas harmless as described in any one of (1) to (3) above, which contains calcium sulfate.

(5) The harm-removing agent for rendering halogen-containing gas harmless as described in (4) above, wherein the content of said calcium sulfate is from 0 to 0.2 per 1 mass in total of iron oxide, alkaline earth metal compound and activated carbon.

(6) The harm-removing agent for rendering halogen-containing gas harmless as described in any one of (1) to (5) above, which is a particulate product obtained by blending the iron oxide, the alkaline earth metal compound, activated carbon and calcium sulfate each in the form of powder having a particle size of 100 μm or less, and granulating the blend.

(7) The harm-removing agent for rendering halogen-containing gas harmless as described in (6) above, which is a particulate product having a particle size of 0.5 to 10 mm.

(8) The harm-removing agent for rendering halogen-containing gas harmless as described in any one of (1) to (7) above, wherein said halogen-containing gas is at least one gas selected from the group consisting of halogen, hydrogen halide, silicon halide, tungsten halide, carbonyl halide, sulfur fluoride, arsenic chloride, phosphorus chloride, aluminum trichloride and boron trichloride.

(9) A harm-removing method for rendering halogen-containing gas harmless, comprising contacting a gas containing halogen-containing gas with the harm-removing agent described in any one of (1) to (8) above.

(10) The harm-removing method for rendering halogen-containing gas harmless as described in (9) above, wherein said halogen-containing gas is at least one gas selected from the group consisting of halogen, hydrogen halide, silicon halide, tungsten halide, carbonyl halide, sulfur fluoride, arsenic chloride, phosphorus chloride, aluminum trichloride and boron trichloride.

(11) A harm-removing method for rendering halogen-containing gas harmless, comprising a step of contacting a gas containing halogen-containing gas with a harm-removing agent comprising activated carbon and subsequently to said step, a step of contacting the gas with the harm-removing agent described in any one of (1) to (8) above.

(12) The harm-removing method for rendering halogen-containing gas harmless as described in (11) above, wherein said activated carbon has a specific surface area of 500 m$^2$/g or more and a particle size of 0.5 to 10 mm.

(13) The harm-removing method for rendering halogen-containing gas harmless as described in (11) or (12) above, wherein said halogen-containing gas contains a halogen gas and further contains at least one gas selected from the group consisting of hydrogen halide, silicon halide, tungsten halide, carbonyl halide, sulfur fluoride, arsenic chloride, phosphorus chloride, aluminum trichloride and boron trichloride.

(14) A harm-removing method for rendering halogen-containing gas harmless comprising a step of contacting a gas containing halogen-containing gas with the harm-removing agent described in any one of (1) to (8) above, and subsequently to said step, a step of contacting the gas with a harm-removing agent comprising zeolite.

(15) The harm-removing method for rendering halogen-containing gas harmless as described in (14) above, wherein said zeolite is synthetic zeolite and/or natural zeolite and has a particle size of 0.5 to 10 mm.

(16) The harm-removing method for rendering halogen-containing gas harmless as described in (14) or (15) above, wherein said synthetic zeolite is MS-5A and/or MS-13X.

(17) The harm-removing method for rendering halogen-containing gas harmless as described in any one of (14) to (16) above, wherein said halogen-containing gas contains sulfur dioxide and further contains at least one gas selected from the group consisting of hydrogen halide, silicon halide, tungsten halide, carbonyl halide, sulfur fluoride, arsenic chloride, phosphorus chloride, aluminum trichloride and boron trichloride.

(18) The harm-removing method for rendering halogen-containing gas harmless as descriebed in any one of (9) to (17) above, wherein the halogen-containing gas concentration in said gas to be treated is 10 vol % or less.

(19) A method for manufacturing a semiconductor device, comprising an etching or cleaning step of using at least one gas selected from the group consisting of fluorocarbon, sulfur hexafluoride, halogen, hydrogen halide and boron trichloride as an etching or cleaning gas, and a harm-removing step of contacting a gas containing halogen-containing gas discharged from said etching or cleaning step with the harm-removing agent described in any one of (1) to (8) above to rendering the halogen-containing gas harmless.

(20) The method for manufacturing a semiconductor device as described in (19) above, wherein said harm-removing step contains a step of contacting the gas with a harm-removing agent comprising activated carbon.

(21) The method for manufacturing a semiconductor device as described in (19) above, wherein said harm-removing step contains a step of contacting the gas with a harm-removing agent comprising zeolite.

(22) The method for manufacturing a semiconductor device as described in any one of (19) to (21), wherein the halogen-containing gas concentration in the gas discharged from the etching or cleaning step is 10 vol % or less.

BEST MODE FOR CARRYING OUT THE INVENTION

Figure 1:
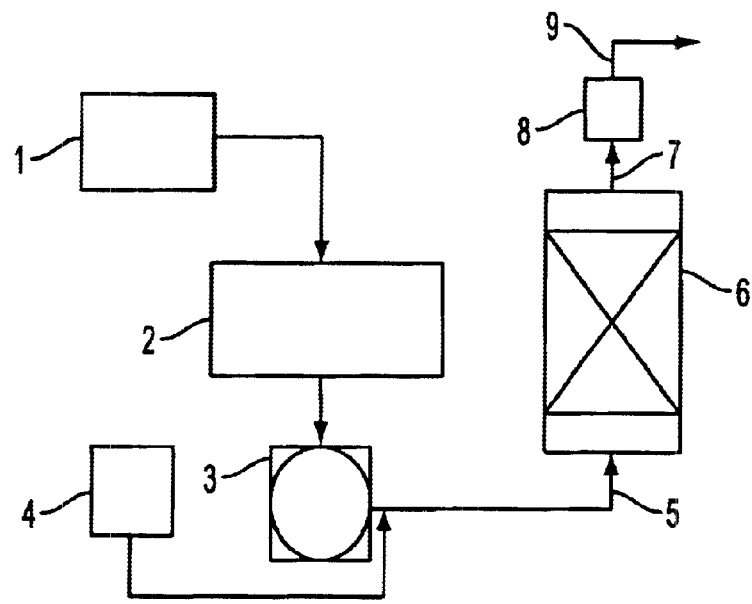
FIG. 1 is a schematic view showing one embodiment of the method for removing harmful gas from exhaust gas containing halogen-containing gas according to the present invention.

According to the dry harm-removing method for removing the exhaust gas containing halogen-containing gas discharged, for example, from the dry etching step in the production process of a semiconductor device, the exhaust gas is introduced together with a carrier gas into a harm-removing cylinder filled with various harm-removing agents and contacted with the agent, and only the gas rendered harmless is discharged out of the system. For detecting the break through (end point) of the harm-removing cylinder, a pH test paper which discolors upon contacting (reacting) with halogen-containing gas in general or a harm-removing apparatus in which hue detector agent, pH indicator or the like supported on a support such as alumina and silica gel is integrated with the harm-removing cylinder is widely and commonly employed (used). The conventional agents and methods (1) to (6) for removing harmful gas described above in the Background Art all have a problem that the harm-removing ability for hydrogen halide is low and since hydrogen halide is early leaked to cause discoloration of the end point-detecting agent, the harm-removing cylinder must be frequently exchanged despite their sufficiently high ability of removing other halogen-containing gases, as a result, the cost increases. However, according to the agent and the method for removing harmful gas of the present invention, the frequency of exchanges of the harm-removing agent decreases and the dry etching exhaust gas can be rendered harmless at the low cost, thus, the problems encountered in the production process of a semiconductor device can be overcome.

The present invention is described in detail below.

The present invention is described below by referring to, as an example, the dry etching in the production process of a semiconductor device. In the dry etching, at least one etching gas selected from fluorocarbon gas, sulfur hexafluoride, halogen, hydrogen halide and boron trichloride is used and if desired, one or more gas selected from oxygen gas, nitrogen gas, hydrogen gas, argon gas and helium gas is added thereto. At the etching of a material to be etched (e.g., $SiO_2$, Si, SiW, SiN, Al, GaAs, GaP, InP), the exhaust gas discharged from the etching apparatus contains, in addition to the above-described etching gas, halogen-containing gas generated during the etching, such as silicon halide, tungsten halide, aluminum chloride, sulfur tetrafluoride and carbonyl halide, and gas produced by the hydrolysis of the halogen-containing gas, such as hydrogen halide and sulfur dioxide. The present invention provides an agent and a method for removing harmful gas from the exhaust gas containing those gases, and a method for manufacturing a semiconductor device using them.

The gas which can be removed by using the agent and the method for removing harmful gas of the present invention is the gas produced during etching and cleaning and discharged from the dry etching step and the cleaning step in the production process of a semiconductor device, and the gas includes halogen-containing gas such as hydrogen halide, silicon halide, tungsten halide, carbonyl halide, sulfur fluoride, arsenic chloride, phosphorus chloride and aluminum trichloride, and sulfur dioxide. The hydrogen halide includes HF, HCl, HBr and HI, the silicon halide includes $SiF_4$, $SiCl_4$ and $SiBr_4$, the tungsten halide includes $WF_6$, $WCl_5$ and $WCl_6$, the carbonyl halide includes $COF_2$ and $COCl_2$, the sulfur fluoride includes $SF_4$ and $SOF_2$, the arsenic chloride includes $AsCl_3$ and $AsCl_5$, and phosphorus chloride includes $PCl_3$ and $PCl_5$. These halogen-containing gases are fixed to the harm-removing agent by physical adsorption or chemical reaction and thereby rendered harmless.

The halogen-containing gas may be a sole gas or a mixture of two or more and the gas is preferably diluted with inert gas such as helium, argon or nitrogen or with air, to 10 vol % or less, more preferably 5 vol % or less, still more preferably 2 vol % or less. Even in the case of a material which is liquid or solid at an ordinary temperature, when the vapor thereof accompanies the above-described inert gas or air, a mixed gas containing it may also be treated.

Even when halogen gas, hydrogen halide gas, boron trichloride or the like used as the etching or cleaning gas remains in the exhaust gas, the gas may be rendered harmless by the method of the present invention similarly to the halogen-containing compound produced by the decomposition. However, when a fluorocarbon or sulfur fluoride compound is used, the etching gas itself may not be effectively treated though the decomposition, product can be treated. In such a case, a separate treating apparatus may be provided.

The harm-removing agent for rendering the halogen-containing gas harmless of the present invention is described below.

The harm-removing agent of the present invention is characterized by containing the later described specific iron oxide, an alkaline earth metal compound and activated carbon in the specific amount. That is, a harm-removing agent obtained by blending and mixing at least three components of specific iron oxide, alkaline earth metal compound and activated carbon in the specific amount is effective in rendering halogen-containing gas harmless, however, a single component system or a two-component system comprising one or two of iron oxide, alkaline earth metal compound and activated carbon cannot bring out the effects described below.

The iron oxides are originally inexpensive and easily available and as long as the agent contains iron oxide as a main component, a harm-removing agent by itself can exert the ability of removing harmful gas such as $H_2S$ and HCl, therefore, such an agent is commercially available from the market. However, the ability of effectively removing hydrogen halide is not sufficiently high and almost no harm-removing effect can be attained particularly for $SiF_4$. An attempt was made by the present inventors to remove a harmful gas in the two-component system by blending an iron oxide and an alkaline earth metal compound or blending an iron oxide and activated carbon but neither exhibited the effect of removing $SiF_4$.

The alkaline earth metal compound is a compound which easily fixes by itself a halogen atom of the halogen-containing gas as a halogenated alkaline earth metal compound. However, when an alkaline earth metal compound alone is actually granulated and used for the removal of harmful gas of HCl and SiF$_4$, the reaction does not stoichiometrically proceed and the ability of removing harmful gas is low, though it is not clearly known whether the gas diffuses to the harm-removing agent and therefore the reaction proceeds only on the surface of the harm-removing agent. Also, when a harm-removing agent is prepared by blending activated carbon and an alkaline earth metal compound with an attempt to overcome the above-described problem by making use of the porosity and gas diffusibility which are the characteristics of activated carbon, it is found from the evaluation for HCl or SiF$_4$ gas that the harm-removing agent does not have a harm-removing ability anticipated from the properties of activated carbon and alkaline earth metal compound.

The activated carbon is originally effective by itself for the gas such as Cl$_2$, Br$_2$, I$_2$, BCl$_3$, SiCl$_4$ and SiBr$_4$, though this is, as is well known, scarcely effective for the gas such as HCl and SiF$_4$. However, the harm-removing agent obtained as described above by blending activated carbon with an iron oxide or blending activated carbon with an alkaline earth metal is almost not improved in the harm-removing effect.

As such, the individual effects of iron oxide, alkaline earth metal compound and activated carbon contained in the harm-removing agent of the present invention are not brought out in the single component system or two-component system. The effect of rendering halogen-containing gas harmless can be first exerted when the harm-removing agent used has a three-component system obtained by blending and mixing iron oxide, alkaline earth metal compound and activated carbon.

The halides of iron and alkaline earth metal produced by the reaction of iron oxide or alkaline earth metal compound in the harm-removing agent with halogen-containing gas are mostly a deliquescent compound except for fluorine-containing compound, therefore, when harmful halogen-containing gas containing almost no fluorine atom is removed, the deliquescent compound gives rise to the clogging of the harm-removing cylinder on great occasions. Accordingly, calcium sulfate may be added to the harm-removing agent of the present invention, whereby even when harmful halogen-containing gas containing almost no fluorine atom is removed, the deliquescent of the harm-removing agent can be prevented successfully. However, when fluorine-containing gas exists together, as the fluoride can prevent the deliquescent, the addition of calcium sulfate is not essential for the present invention.

The iron oxide, alkaline earth metal compound and activated carbon as the raw materials used in the harm-removing agent of the present invention are described below.

The iron oxide is at least one selected from the group consisting of γ-FeOOH (γ-iron oxide hydroxide) and γ-Fe$_2$O$_3$ (γ-ferric oxide) more preferably γ-FeOOH. The reason why γ-FeOOH and γ-Fe$_2$O$_3$ are preferred more than other iron oxides such as α-Fe$_2$O$_3$ is that γ-FeOOH and γ-Fe$_2$O$_3$ each has high reactivity with HCl and the activity is in the order of γ-FeOOH>γ-Fe$_2$O$_3$>α-FeOOH>Fe$_3$O$_4$>>α-Fe$_2$O$_3$, though this is not clearly elucidated due to the small bonding energy between iron atom and oxygen atom. In particular, α-Fe$_2$O$_3$ exhibits almost no harm-removing ability for HCl.

Examples of the alkaline earth metal compounds include hydroxides, oxides and carbonates of magnesium, calcium, strontium and barium. Among these, preferred are hydroxide and oxide compounds of calcium, which are most inexpensive, and most preferred is calcium hydroxide.

Examples of the activated carbon include coconut husk-type, coal-type and charcoal-type activated carbons, with coconut husk activated carbon being preferred. The coconut husk activated carbon suitably has a specific surface area of 500 m$^2$/g or more, preferably 1,000 m$^2$/g or more, in view of the gas diffusibility as a gas adsorption property.

The calcium sulfate is not particularly limited as long as it has the property of preventing the deliquence of the harm-removing agent and does not affect the harm-removing ability thereof, and even calcium sulfate obtained by flue-gas desulfurization may be used.

Each raw material before the blending preferably has a particle size of 100 μm or less, preferably 10 μm or less, more preferably 1 μm or less. A powder material having a particle size of 100 μm or less is preferred because each raw material in the powder form is increased in the specific surface area and disperses with each other, as a result, the iron oxide, alkaline earth metal compound and activated carbon approach one another, without limit, so that combined with the porosity, gas diffusibility and adsorptivity of activated carbon, the chance of halogen-containing gas contacting with iron oxide and alkaline earth metal compound increases. The concentration and kind of impurities in each raw material before the blending are not particularly limited as long as they have no effect on the ability of rendering halogen-containing gas harmless.

The harm-removing agent according to the present invention is characterized by comprising the above-described iron oxide, alkaline earth metal compound and activated carbon in the specific amount. The content ratio of the iron oxide, alkaline earth metal compound and activated carbon blended in the harm-removing agent is such that the iron oxide is from 10 to 40 wt %, the alkaline earth metal compound is from 20 to 80 wt % and the activated carbon is from 10 to 40 wt %, preferably the iron oxide is from 15 to 35 wt %, the alkaline earth metal compound is from 30 to 70 wt % and the activated carbon is from 15 to 35 wt %, more preferably the iron oxide is from 20 to 30 wt %, the alkaline earth metal compound is from 40 to 60 wt % and the activated carbon is from 20 to 30 wt %. With this blending ratio, the properties of each component can be maximally brought out.

In addition to the iron oxide, alkaline earth metal compound and activated carbon each blended in the above-described wt %, the harm-removing agent of the present invention may contain, if desired, calcium sulfate. The content ratio of calcium sulfate is suitably from 0 to 0.2, preferably from 0.05 to 0.1, taking the total mass of iron oxide, alkaline earth metal compound and activated carbon as 1. If the calcium sulfate concentration is excessively low, the effect is lost, whereas if it is excessively high, the total amount of iron oxide, alkaline earth metal compound and activated carbon is relatively reduced and the effect of the calcium sulfate is saturated, as a result, the halogen-containing gas cannot be removed with good efficiency.

Although a sufficiently high effect may be brought out as long as an iron oxide, an alkaline earth metal compound and activated carbon or additionally calcium sulfate are added and mixed, the harm-removing agent of the present invention is preferably a particulate product. When each component is in the above-described blending ratio, a binder is not necessary and satisfactory granulation may be attained only with water. However, in the case where the raw material has a slightly coarse particle size, a binder may be added together with water. The kind and amount of the binder are not limited as long as there is no effect on the performance of the harm-removing agent obtained.

In order to produce the particulate harm-removing agent of the present invention, the raw materials are blended and kneaded after adding thereto an appropriate amount of water, and the kneaded matter is granulated into a particulate product. A kneader where mixing and granulation can be simultaneously performed is convenient as the kneader necessary for the preparation of the particulate product but the mixing and the granulation may be separately performed. For example, when a Henschel mixer or a vertical mixer is used, the mixing and the granulation can be performed at the same time, but it is also possible to mix the raw materials in a Henschel mixer or a V-type mixer and subsequently granulate the mixture in a pan-type pelletizer or a drum pelletizer.

Then, for increasing the hardness and vaporizing water, the granulated product is dried at 100 to 150° C. for 3 to 5 hours in air or inert gas flow such as nitrogen. With respect to the water content of the dried product, when the loss in weight after drying at 110° C. for 2 to 3 hours by an air drier is 1 wt % or less, the purpose may be attained, however, in some cases, the final product is rather preferably has a slight water content so as to exert the effect as a harm-removing agent for $Cl_2$ or $SO_2$ gas.

The harm-removing agent of the present invention, is granulated so as to increase the chance of the dry etching exhaust gas contacting with the harm-removing agent. If the particle size of the harm-removing agent is excessively large, the surface area having a relationship with the adsorption and diffusion of the halogen-containing gas is relatively reduced and the diffusion speed decreases, whereas if the particle size of the harm-removing agent is excessively small, the surface area participating in the adsorption and diffusion increases and the diffusion speed becomes higher but when the amount of gas treated is large, a large differential pressure is caused and hinders the manufacture of a compact harm-removing cylinder (unit) To avoid this, the harm-removing agent may be in the form of pellet, tablet or sphere, and is preferably porous. The particle size of the harm-removing agent is from 0.5 to 10 mm, preferably from 1 to 5 mm.

The method for rendering halogen-containing gas harmless by the use of the harm-removing agent of the present invention is described below. The harm-removing agent of the present invention is generally used as a fixed bed, though it can be used as a fixed bed, a moving bed or a fluid bed. The harm-removing agent of the present invention can be used by filling it alone into the harm-removing cylinder or by filling it together with activated carbon or zeolite into the same harm-removing cylinder to form two layers each in the necessary ratio or into separate harm-removing cylinders. The length of packed bed of the harm-removing agent of the present invention, the length of packed bed of activated carbon or zeolite, and the size (volume and sectional area) of harm-removing cylinder are determined according to the amount (concentration and composition ratio) of objective harmful halogen-containing gas to be removed, the flow rate of dry etching exhaust gas, the allowable installation space, the allowable pressure loss and the like.

The sectional area of the harm-removing cylinder is determined to have a linear velocity (LV) preferably of from 0.1 to 10 m/min within the cylinder. The contact (treatment) pressure of exhaust gas is not particularly limited but on taking account of the fact that the dry etching exhaust gas containing the halogen-containing gas is discharged by a vacuum pump, the contact pressure is suitably from −10 to 20 kPa, preferably from −5 to 5 kPa. The temperature at the treatment of exhaust gas may be an ordinary temperature (from 20 to 30° C.) and heating or cooling is not particularly required. The water content in the dry etching exhaust gas containing the halogen-containing gas, which may be in the dry state or wet state, is sufficient if it is in a concentration of not causing dewing, because the halogen-containing gas is a corrosive gas.

The flow rate of dry etching exhaust gas and the concentration of halogen-containing gas contained therein to which the harm-removing agent of the present invention is applied, are not particularly limited but these are determined by the relationship between the flow rate of exhaust gas and the concentration of halogen-containing gas. If the concentration is excessively low, this is disadvantageous in view of the profitability, whereas if the concentration is excessively high, although it may vary depending on the kind of halogen-containing gas, the temperature of the harm-removing cylinder elevates due to the heat of reaction and adsorption, the concentration of $H_2O$ produced during the reaction increases, and the $H_2O$ is dewed within the cylinder or pipeline to cause problems such as corrosion of the cylinder or pipeline and delinquence of the harm-removing agent. Accordingly, the concentration is suitably 10 vol % or less, preferably 5 vol % or less, more preferably 2 vol % or less.

In the harm-removing method of the present invention, the dry etching exhaust gas containing the halogen-containing gas accompanied by nitrogen carrier gas is passed into the harm-removing cylinder preferably satisfying the above-described conditions and contacted with the harm-removing agent of the present invention and also with activated carbon or zeolite, whereby the halogen-containing gas is fixed (reacted or adsorbed) to each harm-removing agent and rendered harmless.

FIG. 1 is a view showing one example of the harm-removing apparatus for implementing the present invention. The numerals 1 to 4 show an etching system. An etching gas is fed from an etching gas feeding unit 1 and plasma is generated within an etching chamber 2 depressurized by a vacuum pump 3, whereby an objective etching material in the etching chamber 2 is etched. The etching exhaust gas from the etching system shown by 1 to 4 is discharged by the vacuum pump 3 and nitrogen gas 4 for purging the vacuum pump (carrier gas for the etching exhaust gas). The numerals 5 to 9 shows a harm-removing system. The exhaust gas containing the halogen-containing gas is introduced into a harm-removing cylinder 6 from an inlet 5 of the harm-removing cylinder and according to the harmful gas to be removed, contacted with the harm-removing agent of the present invention, activated carbon and zeolite filled in the cylinder, whereby the halogen-containing gas is fixed to the harm-removing agent of the present invention, activated carbon or zeolite by physical means (adsorption) or chemical means (as a halogen compound). The exhaust gas rendered harmless is passed through a gas detector 8 through an outlet 7 of the harm-removing cylinder and after the presence or absence of leak of the halogen-containing gas is confirmed, released into air from an exhaust gas outlet 9 through the exhaust duct. The limiting ability (break through detection) of the harm-removing cylinder can be known by a gas detector 8. The gas detector 8 may be a container filled with a hue detecting agent (paper) capable of discoloring by halogen-containing gas and integrated with the harm-removing cylinder (a container of a type such that discoloration of the hue detecting agent occurring in the inside can be monitored from the outside).

The method for filling the harm-removing agent of the present invention and activated carbon or zeolite into a harm-removing cylinder is described below.

If a constant amount of water is contained in the harm-removing agent of the present invention, the harm-removing ability is improved for most of harmful halogen-containing gases, particularly for $Cl_2$ and $SO_2$, however, this is not practical as a harm-removing agent for dry etching exhaust gas. More specifically, the dry etching is an intermittent operation pattern comprising as one cycle, conveyance of a wafer (etching material), pretreatment, etching and the like (dry cleaning is also an intermittent operation), and in a great deal of time, the exhaust gas introduced into the harm-removing cylinder contains only the carrier (nitrogen) gas but not containing the halogen-containing gas. Therefore, water in the harm-removing agent is dehydrated upon contacting with the exhaust gas and despite the remaining ability of rendering halogen-containing gas harmless except for $Cl_2$ and $SO_2$, the harm-removing agent (cylinder) shows the break through (end point) due to the reduction in the ability of removing $Cl_2$ or $SO_2$, as a result, exchange of the harm-removing cylinder is required.

Accordingly, in order to obtain a harm-removing method free of any influence by the nitrogen carrier gas, the harm-removing agent of the present invention must be made to contain almost no water, moreover, a method of removing harmful dry etching exhaust gas for the case where $Cl_2$, $SO_2$ or a component gas of producing $SO_2$ upon hydrolysis is contained in the gas to be treated, and a method for the case where these are not contained are necessary (this does not apply when such a gas is contained in a slight amount as shown in the Examples).

Figure 2:
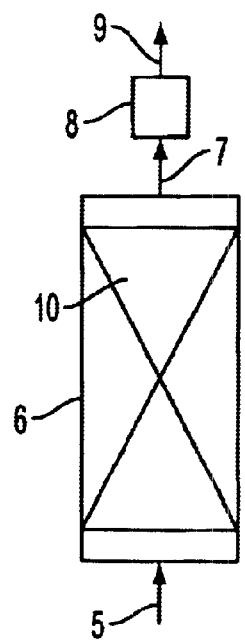
FIG. 2 is a schematic view showing one embodiment of the method for removing harmful gas from exhaust gas containing halogen-containing gas according to the present invention.
Figure 3:
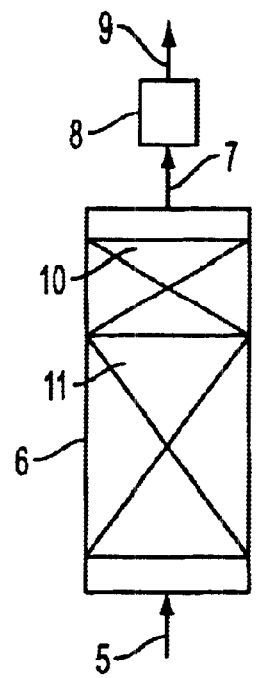
FIG. 3 is a schematic view showing one embodiment of the harm-removing method where the harm-removing agent of the present invention is combined with a harm-removing agent comprising activated carbon.

In the case of an exhaust gas where $Cl_2$, $SO_2$ or a component gas of producing $SO_2$ upon hydrolysis is scarcely contained in the gas to be treated, halogen-containing gas contained in the gas treated can be removed, as shown in FIG. 2, by introducing the exhaust gas using a nitrogen carrier gas into a harm-removing cylinder filled with the harm-removing agent 10 only of the present invention and contacting the gas to be treated with the harm-removing agent. However, for example, when aluminum is etched with $Cl_2$, the exhaust gas contains $Cl_2$, therefore, the use of the dried harm-removing agent alone is not enough to ensure the ability of removing harmful gas as described above. To overcome this, the exhaust gas is first contacted with activated carbon having a high $Cl_2$ adsorption ability and then contacted with the harm-removing agent of the present invention having a high ability of removing HCl gas which is produced in the process of $Cl_2$ adsorbing to the activated carbon or in the etching step and which is not removed by activated carbon, thereby removing harmful gas from the dry etching exhaust gas containing $Cl_2$. In this case, the harm-removing ability is elevated as compared with the use of individual harm-removing agents alone. That is, as shown in FIG. 3, by introducing the dry etching exhaust gas containing $Cl_2$ from the inlet 5 into the harm-removing cylinder 6 filled with activated carbon 11 and the harm-removing agent 10 of the present invention in this order (as long as the order is first the activated carbon 11 and then the harm-removing agent 10 of the present invention, it may be also possible to use separate harm-removing cylinders), a harm-removing method elevated in the harm-removing ability can be attained. The ratio of the activated carbon 11 to the harm-removing agent 10 of the present invention may be determined according to the composition ratio of $Cl_2$ in the dry etching exhaust gas to other halogen-containing gases. The example of the activated carbon for use in the harm-removing method of the present invention includes coconut husk carbon type, coal type and charcoal type. Among these, preferred is the coconut husk activated carbon having a specific surface area of 500 $m^2/g$ or more, more preferably 1,000 $m^2/g$ or more, and having a pore distribution necessary for the gas adsorption, such that the peak is present before or after 20 Å.

Figure 4:
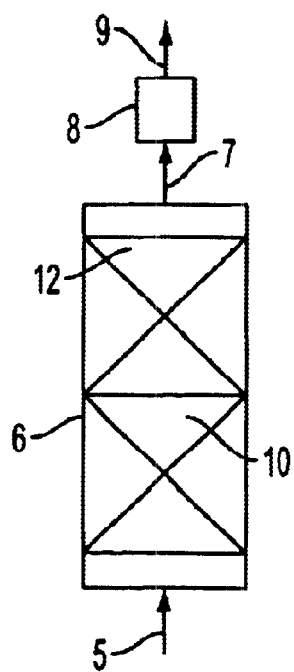
FIG. 4 is a schematic view showing one embodiment of the harm-removing method where the harm-removing agent of the present invention is combined with a harm-removing agent comprising zeolite.

The exhaust gas after the etching of silicon or silicon oxide film using $SF_6$ contains gases originated from the $SF_6$, such as $SF_4$ and $SOF_2$, namely, gases of producing $SO_2$ upon hydrolysis. In this case, with the use of the dried harm-removing agent of the present invention alone, the fluorine elements in the compound such as $SF_4$ and $SOF_2$, are fixed to the harm-removing agent of the present invention as an alkaline earth metal fluoride such as $CaF_2$, and sulfur elements are fixed as alkaline earth metal/sulfur compound such as $CaSO_3$. However, particularly in the case where the compounds such as $SF_4$ and $SOF_2$ are produced in a large amount, the amount of $CaSO_3$ produced is also large and the sulfur elements once fixed are regenerated as $SO_2$ by the reaction with hydrogen halide. Accordingly, a dry etching exhaust gas containing $SO_2$ is contacted with the harm-removing agent of the present invention and then with zeolite, whereby the harm-removing ability can be elevated as compared with the use of individual harm-removing agents alone. That is, as shown in FIG. 4, by introducing a dry etching exhaust gas containing $SO_2$ (also containing $SF_4$ or $SOF_2$) from the inlet 5 into the harm-removing cylinder 6 filled with the harm-removing agent 10 of the present invention and with zeolite 12 in this order (as long as the order is first the harm-removing agent 10 of the present invention and then zeolite 12, it may be also possible to use separate harm-removing cylinders), a harm-removing method elevated in the harm-removing ability can be attained. The ratio of the harm-removing agent 10 of the present invention to zeolite 12 may be determined according to the composition ratio of $SO_2$ (including $SF_4$ or $SOF_2$) in the dry etching exhaust gas to other halogen-containing gases. The example of zeolite for use in the present invention includes natural zeolite and synthetic zeolite (e.g., MS-5A, MS-13X). Among these, preferred is synthetic zeolite and more preferred is MS-13X having a large $SO_2$ adsorption ability.

As described in the forgoings, according to the method for removing harmful gas from a dry etching exhaust gas containing halogen-containing gas of the present invention, the exhaust gas is passed through a harm-removing cylinder filled with the harm-removing agent of the present invention alone or together with activated carbon or zeolite in the two-layer structure, whereby the harm-removing method can be improved in the harm-removing ability per unit volume and an exhaust gas containing halogen-containing gas discharged from the etching or cleaning step in the production process of a semiconductor device can be effectively rendered harmless.

The method for manufacturing a semiconductor device including a step of removing halogen-containing gas using the above-described harm-removing agent and harm-removing method is described below.

The present invention is a method for manufacturing a semiconductor device, comprising an etching or cleaning step of using at least one gas selected from the group consisting of fluorocarbon, sulfur hexafluoride, halogen, hydrogen halide and boron trichloride as an etching or cleaning gas, and a harm-removing step of contacting a gas containing halogen-containing gas discharged from the etching or cleaning step with the above-described harm-removing agent.

In the manufacturing process of a semiconductor device such as LSI and TFT, a thin or thick film is formed using the CVD method, sputtering method or vapor deposition method and etched to form a circuit pattern. The apparatus for forming the thin or thick film is cleaned in order to remove unnecessary deposit accumulated on the inner wall of the apparatus, jig and the like, because unnecessary deposit accumulated causes generation of particles and must be removed on occasions so as to form a good film.

The etching step using halogen gas such as fluorine, chlorine and bromine may be performed under the dry etching conditions such as plasma etching described, for example, in JP-A-4-314331. In the gas exhausted from the etching step, gases such as hydrogen halide, silicon halide, tungsten halide and carbonyl halide are generated as decomposition products, in addition to the above-described halogen gas, however, these compounds can be rendered harmless by using the harm-removing agent of the present invention. In the case of using chlorine gas as the etching gas, unreacted chlorine gas is exhausted in some cases. In such a case, the chlorine gas can also be effectively removed, as described above, by contacting the exhaust gas with a harm-removing agent comprising activated carbon before the treatment with the harm-removing agent of the present invention.

The etching step using a gas such as fluorocarbon or sulfur fluoride can be performed under the dry etching conditions such as plasma etching described, for example, in JP-A-4-121379. Also in this case, gases such as hydrogen halide, silicon halide, tungsten halide and carbonyl halide are similarly generated, but these compounds can be rendered harmless by using the harm-removing agent of the present invention. In the case of performing the etching using sulfur fluoride, sulfur dioxide is generated as a decomposition product in some cases. Even in such a case, the sulfur dioxide can also be effectively removed, as described above, by contacting the exhaust gas with a harm-removing agent comprising zeolite after the treatment with the harm-removing agent of the present invention.

EXAMPLES

The present invention is described in greater detail below by referring to the Examples and Comparative Examples, however, the present invention is by no means limited to these Examples.

Preparation Example of Harm-Removing Agent

Various raw materials of the harm-removing agent used in each Example are shown in Table 1.

TABLE 1

| Name of Raw Materials of Harm-removing Agent for Tests | | Average Particle Size ($\mu$m) | Specific Surface Area ($m^2$/g) | Produced By (available from) |
|---|---|---|---|---|
| Ferric oxide | $\alpha$-$Fe_2O_3$ | <1 | 25 | Junsei Kagaku K.K. |
| | $\alpha$-FeOOH | <1 | 70 | Toda Kogyo K.K. |
| | $\gamma$-$Fe_2O_3$ | <1 | 20 | Toda Kogyo K.K. |
| | $\gamma$-FeOOH | <1 | 60 | Ishihara Techno K.K. |
| | $Fe_3O_4$ | <1 | 5 | Junsei Kagaku K.K. |
| Alkaline earth metal compound | Calcium hydroxide Ca(OH)$_2$ | 5 | 15 | Yoshizawa Sekkai Kogyo K.K. |
| | Strontium hydroxide Sr(OH)$_2$ | <1 | — | Junsei Kagaku K.K. |

TABLE 1-continued

| Name of Raw Materials of Harm-removing Agent for Tests | | Average Particle Size ($\mu$m) | Specific Surface Area ($m^2$/g) | Produced By (available from) |
|---|---|---|---|---|
| Activated carbon | Coconut husk-type activated carbon (Y-180C) | — | 1,000 to 1,500 | Ajinomoto Fine Techno K.K. |
| | Coal-type activated carbon (F-17C) | — | 1,000 to 1,500 | Ajinomoto Fine Techno K.K. |
| Activated alumina ($\gamma$-$Al_2O_3$) | | 5 | 200 | Mizusawa Kagaku K.K. |
| Natural zeolite | | 50 | — | Kunimine Kogyo K.K. |
| Calcium sulfate ($CaSO_4$) | | 1 | — | Junsei Kagaku K.K. |

The substances shown in Table 1 were used as the raw materials and these substances were blended and mixed in a Henschel mixer under the test conditions, for example, shown in Tables 3, 4 and 5. After water was added and the mixture was granulated, the particles obtained were dried at 110° C. for 3 hours and sieved to prepare a granulated product having a particle size of 0.85 to 2.8 mm.

(Commercially Available Harm-Removing Agent and Adsorbent)

The harm-removing agents and adsorbents used in the tests except for those prepared above are shown in Table 2.

TABLE 2

| Kind of Commercially Available Harm-removing Agent and Adsorbent | Particle Size (mm) | Specific Surface Area ($m^2$/g) | Produced By (available from) |
|---|---|---|---|
| Coconut husk activated carbon Y-10 | 0.5 to 3.0 | >1,100 | Ajinomoto Fine Techno K.K. |
| Zeolite MS-3A | 1.0 to 2.0 | — | Union Showa K.K. |
| Zeolite MS-4A | 1.0 to 2.0 | — | Union Showa K.K. |
| Zeolite MS-5A | 1.0 to 2.0 | — | Union Showa K.K. |
| Zeolite MS-13X | 1.0 to 2.0 | — | Union Showa K.K. |
| Activated alumina ($\gamma$-$Al_2O_3$) | 1.0 to 2.0 | 210 | Mizusawa Kagaku K.K. |
| Soda lime | 1.5 to 3.5 | — | Junsei Kagaku K.K. |
| NaOH-attached activated carbon YN-4 | 2.0 to 5.0 | >1,100 | Ajinomoto Fine Tech K.K. |

Example of Harm-Removing

Using an apparatus having the same principle as shown in FIG. 1, the method of the present invention was performed under respective test conditions shown in Tables 3 and 4. More specifically, a harm-removing agent used for the test was filled into an acryl-made cylinder (20 mm (inside diameter)×1,000 mm (length)) to a layer height of 550 mm (volume: 173 ml), and into this acryl-made harm-removing cylinder, an exhaust gas (simulation) using nitrogen gas as the diluting and carrier gas was passed. At this time, the conditions were as follows:

| | |
|---|---|
| Flow rate of gas treated: | 0.75 l/min |
| Concentration of target (halogen-containing) gas to be removed in the gas treated: | 1.0 vol % |
| Linear velocity of gas treated: | 1.85 m/min |

In any test, the concentration of the gas treated and the concentration of the target (halogen-containing) gas to be removed in the gas treated were analyzed by the gas detecting tube method or pure water absorption ion chromatography. The ability is shown by the molar number of the halogen-containing gas per the unit volume of the harm-removing agent, which was obtained from the molar amount of each target (halogen-containing) gas passed through until the break through (ability limit of harm-removing agent) and the amount of the harm-removing agent filled, assuming that the point when a target (halogen-containing) gas concentration of 1 ppm by volume was detected in the outlet gas of the harm-removing cylinder, is the break through.

Ability of harm-removing agent (adsorbent) (mol/$L$-agent)=($C$/100×$Q$×$T$)÷($R$×$V$/1,000)

wherein

C: target gas concentration in cylinder inlet exhaust gas (vol %)

Q: flow rate of exhaust gas (L/min)

T: time necessary for passing exhaust gas until break through

R: gas coefficient (test temperature and pressure each is a corrected coefficient)

V: amount of harm-removing agent (adsorbent) filled (ml)

As described below in the Examples, the tests of the present invention were also practiced using an actual apparatus having the same principle as shown in FIG. 1. That is, using an exhaust gas containing halogen-containing gas discharged from an actual dry etching step, the conventional harm-removing method and the harm-removing method using the harmful removing agent of the present invention in combination with activated carbon or zeolite were tested and compared. In this case, the limit of the harm-removing ability was determined by detecting the break through (end point) as a time when the hue detecting agent in the detector integrally provided at the outlet of the harm-removing cylinder discolors, and the ability was relatively compared under the same conditions of etching and the same volume of harm-removing agents (cylinders). More specifically, the ability was compared and verified by the time spent until halogen-containing gas in the dry etching exhaust gas could be removed (total number of hours when the etching gas was actually fed and etching was performed) or by the number of pieces of wafer (etching material) treated during that time (number of pieces of etching batch×number of times of etching).

EXAMPLES 1 to 5

In Examples 1 to 5, the tested harm-removing agents were prepared, as shown in the test conditions of Table 3, by using a three-component system of ferric oxide (γ-FeOOH or γ-Fe$_2$O$_3$), alkaline earth metal compound and activated carbon or by adding calcium sulfate to the three component system. The results obtained are shown in the test results of Table 3 and from this, it is seen that sufficiently high ability was obtained in both the ability of removing SiF$_4$ and the ability of removing HCl.

COMPARATIVE EXAMPLES 1 to 5

In Comparative Examples 1 to 5, the tested harm-removing agents were prepared, as shown in the test conditions of Table 4, by using a three-component system of iron oxide excluding γ-FeOOH and γ-Fe$_2$O$_3$, alkaline earth metal compound and activated carbon or by using a three component system of γ-FeOOH, alkaline earth metal compound and activated carbon while varying the blending ratio of each raw material. The results obtained are shown in the test results of Table 4 and from this, it is seen that the harm-removing ability was low for both SiF$_4$ and HCl in comparison with the harm-removing agent of the present invention.

COMPARATIVE EXAMPLES 6 to 10

In Comparative Examples 6 to 10, as shown in the test conditions of Table 5, the tested harm-removing agents were prepared by using iron oxide alone. The results obtained are shown in the test results of Table 5 and from this, it is seen that the ability of removing HCl was high only when γ-FeOOH was used, and the ability of removing SiF$_4$ was not sufficiently high for any iron oxide.

COMPARATIVE EXAMPLES 11 to 15

In Comparative Examples 11 to 15, as shown in the test conditions of Table 5, the tested harm-removing agents were prepared by using alkaline earth metal compound alone or activated carbon alone or by using a two-component system of any two of ferric oxide (γ-FeOOH), alkaline earth metal compounds and activated carbon. The results obtained are shown in the test results of Table 5 and from this, it is seen that the ability of removing SiF$_4$ was not greatly improved in any case.

COMPARATIVE EXAMPLES 16 to 24

In Comparative Examples 16 to 24, as indicated in the test conditions of Table 6, the tests were performed in the same manner as above using a commercially available harm-removing agent of activated alumina, natural zeolite, synthetic zeolite, soda lime or sodium hydroxide-attached activated carbon. The results obtained are shown in the test results of Table 6 and from this, it is seen that the ability of removing HCl and SiF$_4$ was low in comparison with the harm-removing agent of the present invention in any case.

Among these commercially available harm-removing agents, activated carbon (coconut husk activated carbon, NaOH-attached activated carbon) exhibited highest ability of removing Cl$_2$, and natural zeolite and synthetic zeolite (MS-5A, MS-13X) exhibited high ability of removing SO$_2$, with MS-13X being highest in the ability.

EXAMPLE 6

Using an actual apparatus having the same principle as shown in FIG. 1, the tests of the present invention were performed. The harm-removing agents were filled as follows. As shown in FIG. 3, activated carbon (organic alkali-attached activated carbon) and the harm-removing agent of the present invention were filled to form a two-layer structure at a ratio of 7:3. In the apparatus for comparison, an organic alkali-attached activated carbon was filled alone (in 100%). These were each filled into a harm-removing cylinder having an effective volume of 130 L.

The tests were performed by introducing an exhaust gas of dry etching process in which the poly-silicon was etched by an etching gas containing 50 SCCM HBr and 50 SCCM $Cl_2$ under the same etching conditions into each of those harm-removing cylinders by using 20 SLM nitrogen carrier gas. The results obtained were compared by the total hours counted in etching until a hue detector provided integrally with the harm-removing cylinder was discolored. The total hours of apparatus for comparison was 200 hours, while it was 500 hours by using an apparatus where organic alkali-attached activated carbon was combined with the harm-removing agent of the present invention. Thus, the harm-removing ability in the harm-removing method of the present invention was revealed to be 2.5 times higher.

EXAMPLE 7

Using an actual apparatus having the same principle as shown in FIG. 1, the tests of the present invention were performed. The harm-removing agents were filled as follows. As shown in FIG. 3, activated carbon (coconut husk activated carbon) and the harm-removing agent of the present invention were filled to form a two-layer structure at a ratio of 7:3. In the apparatus for comparison, an organic alkali-attached activated carbon was filled alone (in 100%). These were each filled into a harm-removing cylinder having an effective volume of 130 L.

The tests were performed by introducing an exhaust gas of dry etching process in which the aluminum was etched by an etching gas containing 50 SCCM $BCl_3$, 100 SCCM $Cl_2$ and 100 SCCM Ar under the same etching conditions into each of those harm-removing cylinders by using 20 SLM nitrogen carrier gas. The results obtained were compared by the total hours counted in etching until a hue detector provided integrally with the harm-removing cylinder was discolored. The total hours of apparatus for comparison was 480 hours, while it was 950 hours by using an apparatus where coconut husk activated carbon was combined with the harm-removing agent of the present invention. Thus, the harm-removing ability in the harm-removing method of the present invention was revealed to be about 2 times higher.

EXAMPLE 8

Using an actual apparatus having the same principle as shown in FIG. 1, the tests of the present invention were performed. The harm-removing agents were filled as follows. As shown in FIG. 2, the harm-removing agent of the present invention was filled alone (in 100%). In the apparatus for comparison, an organic alkali-attached activated carbon was filled alone (in 100%). These were each filled into a harm-removing cylinder having an effective volume of 130 L. The tests were performed by introducing an exhaust gas of dry etching process in which the poly-silicon was etched by an etching gas containing 20 SCCM HBr, 200 SCCM HCl, 200 SCCM He and 5 SCCM $SF_6$ under the same etching conditions, into each of those harm-removing cylinders by using 20 SLM of nitrogen carrier gas. The results obtained were compared by the total hours counted in etching until a hue detector provided integrally with the harm-removing cylinder was discolored. The total hours of apparatus for comparison was 700 hours, while it was 3,500 hours by using an apparatus where harm-removing agent of the present invention was filled. Thus, the harm-removing ability in the harm-removing method of the present invention was revealed to be about 5 times higher.

EXAMPLE 9

As shown in FIG. 4, the harm-removing agent of the present invention and zeolite were filled to form a two-layer structure at a ratio of 5:5. In an apparatus for comparison, an organic alkali-attached activated carbon in the specific amount was filled alone (in 100%). These were each filled into a harm-removing cylinder having an effective volume of 130 L. The test were performed by introducing a dry etching exhaust gas of etching process in which the silicon was etched with an etching gas containing 700 SCCM HCl and 700 SCCM $SF_6$ under same etching conditions, into each of those harm-removing cylinders by using 20 SLM of nitrogen carrier gas. The results obtained were compared by the number of pieces of silicon wafer treated until a hue detector provided integrally with the harm-removing cylinder was discolored. The number of pieces was 20,000 in the case of the apparatus for comparison, while it was 42,000 in the case of the apparatus where the harm-removing agent of the present invention was combined with zeolite. Thus, the harm-removing ability in the harm-removing method of the present invention was revealed to be about 2 times higher

TABLE 3

| | | Test Conditions | | | Test Results | |
|---|---|---|---|---|---|---|
| | | Composition of Harm-removing Agent Prepared and Kind of Commercially Available Harm- | Harm-removing Agent | | | |
| | Example | removing Agent (Adsorbent) (blending ratio of raw materials of harm-removing agent prepared, wt %) | Bulk Density (g/ml) | Specific Surface Area ($m^2/g$) | Ability of Removing HCl (mol/l-agent) | Ability of Removing $SiF_4$ (mol/l-agent) |
| | 1 | γ-FeOOH/Ca(OH)$_2$/AC(Y-180C) (25/50/25) | 0.61 | 264 | 8.2 | 2.2 |
| | 2 | γ-Fe$_2$O$_3$/Ca(OH)$_2$/AC(Y-180C) (25/50/25) | 0.66 | 241 | 7.6 | 2.0 |
| | 3 | γ-FeOOH/Sr(OH)$_2$/AC(Y-180C) (25/50/25) | 0.66 | 234 | 7.9 | 2.0 |
| | 4 | γ-FeOOH/Ca(OH)$_2$/AC(F-17C) (25/50/25) | 0.62 | 272 | 7.7 | 2.0 |
| | 5 | γ-FeOOH/Ca(OH)$_2$/AC(Y-180C)/CaSO$_4$ (25/45/20/10) | 0.64 | 219 | 8.0 | 2.1 |

TABLE 4

Test Conditions

| Comparative Example | Composition of Harm-removing Agent Prepared and Kind of Commercially Available Harm-removing Agent (Adsorbent) (blending ratio of raw materials of harm-removing agent prepared, wt %) | Harm-removing Agent Bulk Density (g/ml) | Specific Surface Area (m²/g) | Test Results Ability of Removing HCl (mol/l-agent) | Ability of Removing SiF₄ (mol/l-agent) |
|---|---|---|---|---|---|
| 1 | αFeOOH/Ca(OH)₂/AC(Y-180C) (25/50/25) | 0.66 | 270 | 4.9 | 0.5 |
| 2 | α-Fe₂O₃/Ca(OH)₂/AC(Y-180C) (25/50/25) | 0.72 | 255 | 1.5 | 0.4 |
| 3 | Fe₃O₄/Ca(OH)₂/AC(Y-180C) (25/50/25) | 0.73 | 239 | 3.5 | 0.4 |
| 4 | γ-FeOOH/Ca(OH)₂/AC(Y-180C) (5/90/5) | 0.70 | 128 | 5.0 | 0.4 |
| 5 | γ-FeOOH/Ca(OH)₂/AC(Y-180C) (45/10/45) | 0.60 | 351 | 5.2 | 0.3 |

TABLE 5

Test Conditions

| Comparative Example | Composition of Harm-removing Agent Prepared and Kind of Commercially Available Harm-removing Agent (Adsorbent) (blending ratio of raw materials of harm-removing agent prepared, wt %) | Harm-removing Agent Bulk Density (g/ml) | Specific Surface Area (m²/g) | Test Results Ability of Removing HCl (mol/l-agent) | Ability of Removing SiF₄ (mol/l-agent) |
|---|---|---|---|---|---|
| 6 | α-FeOOH (100) | 0.68 | 60 | 0.2 | 0.1 |
| 7 | α-Fe₂O₃ (100) | 1.30 | 20 | 0.2 | 0.1 |
| 8 | γ-FeOOH (100) | 0.60 | 67 | 10.4 | 0.3 |
| 9 | γ-Fe₂O₃ (100) | 0.77 | 25 | 0.7 | 0.1 |
| 10 | Fe₃O₄ (100) | 1.13 | 7 | 0.6 | 0.1 |
| 11 | γFeOOH/Ca(OH)₂ (50/50) | 0.67 | 26 | 8.7 | 0.6 |
| 12 | γ-FeOOH/AC(Y-180C) (60/40) | 0.51 | 369 | 8.9 | 0.4 |
| 13 | Ca(OH)₂ (100) | 0.61 | 17 | 5.8 | 0.5 |
| 14 | AC(Y-10) (100) | 0.46 | >1100 | 0.5 | 0.1 |
| 15 | Ca(OH)₂/AC(Y-180) (70/30) | 0.66 | 311 | 4.2 | 0.6 |

TABLE 6

Test Conditions

| Comparative Example | Kind of Commercially Available Harm-removing Agent (Adsorbent) | Harm-removing Agent Bulk Density (g/ml) | Specific Surface Area (m²/g) | Test Results Ability of Removing HCl (mol/l-agent) | Ability of Removing SiF₄ (mol/l-agent) | Ability of Removing Cl₂ (mol/l-agent) | Ability of Removing SO₂ (mol/l-agent) |
|---|---|---|---|---|---|---|---|
| 16 | activated alumina (γ-Al₂O₃) | 0.58 | 250 | 1.2 | 0.4 | 0.8 | 0.2 |
| 17 | natural zeolite | 0.71 | — | 0.6 | 0.3 | 0.3 | 2.0 |
| 18 | synthetic zeolite MS-3A | 0.70 | — | 0.9 | 0.1 | 0.3 | 0.1 |
| 19 | synthetic zeolite MS-4A | 0.67 | — | 1.0 | 0.1 | 0.3 | 0.1 |
| 20 | synthetic zeolite MS-5A | 0.67 | — | 1.0 | 0.2 | 0.3 | 2.4 |

TABLE 6-continued

| | Test Conditions | | | | | | |
|---|---|---|---|---|---|---|---|
| | Kind of Commercially | Harm-removing Agent | | Test Results | | | |
| Comparative Example | Available Harm-removing Agent (Adsorbent) | Bulk Density (g/ml) | Specific Surface Area (m²/g) | Ability of Removing HCl (mol/l-agent) | Ability of Removing $SiF_4$ (mol/l-agent) | Ability of Removing $Cl_2$ (mol/l-agent) | Ability of Removing $SO_2$ (mol/l-agent) |
| 21 | synthetic zeolite MS-13X | 0.60 | — | 1.2 | 0.2 | 0.6 | 3.0 |
| 22 | Soda lime | 0.87 | — | 4.8 | 0.6 | 1.0 | 1.2 |
| 23 | coconut husk activated carbon Y-10 | 0.46 | >1,100 | 0.5 | 0.1 | 1.9 | 0.8 |
| 24 | NaOH-attached activated carbon YN-4 | 0.52 | >1,100 | 1.0 | 0.4 | 1.9 | 1.1 |

[Effects of the Invention]

As described in the foregoing pages, the harm-removing agent comprising the specific iron oxide, the alkaline earth metal compound and activated carbon in the specific amount of the present invention exhibits high harm-removing ability particularly for hydrogen halide and can effectively remove harmful gas from the exhaust gas containing halogen-containing gas discharged from the manufacturing process of a semiconductor device. Even when the exhaust gas contains halogen gas such as chlorine or a gas such as sulfur dioxide, these gases can be rendered harmless by using the harm-removing method of the present invention where a harm-removing agent comprising activated carbon or zeolite is combined.

What is claimed is:

1. A harm-removing agent for rendering halogen-containing gas harmless, comprising 10 to 40 wt % of an iron oxide selected from the group consisting of γ-iron oxide hydroxide and γ-ferric oxide, 20 to 80 wt % of an alkaline earth metal compound and 10 to 40 wt % of an activated carbon.

2. The harm-removing agent for rendering halogen-containing gas harmless as claimed in claim 1, wherein said alkaline earth metal compound is at least one selected from the group consisting of oxides, hydroxides and carbonates of magnesium, calcium, strontium and barium.

3. The harm-removing agent for rendering halogen-containing gas harmless as claimed in claim 1 or 2, wherein said activated carbon has a specific surface area of 500 m²/g and more.

4. The harm-removing agent for rendering halogen-containing gas harmless as claimed in claim 1 or 2, which contains calcium sulfate.

5. The harm-removing agent for rendering halogen-containing gas harmless as claimed in claim 4, wherein the content of said calcium sulfate is from 0 to 0.2 per 1 mass in total of iron oxide, alkaline earth metal compound and activated carbon.

6. The harm-removing agent for rendering halogen-containing gas harmless as claimed in claim 1 or 2, which is a particulate product obtained by blending the iron oxide, the alkaline earth metal compound, activated carbon and calcium sulfate each in the form of powder having a particle size of 100 μm or less, and granulating the blend.

7. The harm-removing agent for rendering halogen-containing gas harmless as claimed in claim 6, which is a particulate product having a particle size of 0.5 to 10 mm.

8. The harm-removing agent for rendering halogen-containing gas harmless as claimed in claim 1 or 2, wherein said halogen-containing gas is at least one gas selected from the group consisting of halogen, hydrogen halide, silicon halide, tungsten halide, carbonyl halide, sulfur fluoride, arsenic chloride, phosphorus chloride, aluminum trichloride and boron trichloride.

9. A harm-removing method for rendering halogen-containing gas harmless, comprising contacting a gas containing halogen-containing gas with the harm-removing agent described in claim 1.

10. The harm-removing method for rendering halogen-containing gas harmless as claimed in claim 9, wherein said halogen-containing gas is at least one gas selected from the group consisting of halogen, hydrogen halide, silicon halide, tungsten halide, carbonyl halide, sulfur fluoride, arsenic chloride, phosphorus chloride, aluminum trichloride and boron trichloride.

11. A harm-removing method for rendering halogen-containing gas harmless, comprising a step of contacting a gas containing halogen-containing gas with a harm-removing agent comprising activated carbon and subsequently to said step, a step of contacting the gas with the harm-removing agent described in claim 1.

12. The harm-removing method for rendering halogen-containing gas harmless as claimed in claim 11, wherein said activated carbon has a specific surface area of 500 m²/g or more and a particle size of 0.5 to 10 mm.

13. The harm-removing method for rendering halogen-containing gas harmless as claimed in claim 11 or 12, wherein said halogen-containing gas contains a halogen gas and further contains at least one gas selected from the group consisting of hydrogen halide, silicon halide, tungsten halide, carbonyl halide, sulfur fluoride, arsenic chloride, phosphorus chlorides aluminum trichloride and boron trichloride.

14. A harm-removing method for rendering halogen-containing gas harmless comprising a step of contacting a gas containing halogen-containing gas with the harm-removing agent described in claim 1 and subsequently to said step, a step of contacting the gas with a harm-removing agent comprising zeolite.

15. The harm-removing method for rendering halogen-containing gas harmless as claimed in claim 14, wherein said zeolite is synthetic zeolite and/or natural zeolite and has a particle size of 0.5 to 10 mm.

16. The harm-removing method for rendering halogen-containing gas harmless as claimed in claim 15, wherein said synthetic zeolite is MS-5A and/or MS-13X.

17. The harm-removing method for rendering halogen-containing gas harmless as claimed in any one of claims 14 to 16, wherein said halogen-containing gas contains sulfur dioxide and further contains at least one gas selected from the group consisting of hydrogen halide, silicon halide, tungsten halide, carbonyl halide, sulfur fluoride, arsenic chloride, phosphorus chloride, aluminum trichloride and boron trichloride.

18. The harm-removing method for rendering halogen-containing gas harmless as claimed in claim 9, 11 or 14, wherein the halogen-containing gas concentration in said gas to be treated is 10 vol % or less.

19. A method for manufacturing a semiconductor device, comprising an etching or cleaning step of using at least one gas selected from the group consisting of fluorocarbon, sulfur hexafluoride, halogen, hydrogen halide and boron trichloride as an etching or cleaning gas, and a harm-removing step of contacting a gas containing halogen-containing gas discharged from said etching or cleaning step with the harm-removing agent described in claim 1 to render the halogen-containing gas harmless.

20. The method for manufacturing a semiconductor device as claimed in claim 19, wherein said harm-removing step contains a step of contacting the gas with a harm-removing agent comprising activated carbon.

21. The method for manufacturing a semiconductor device as claimed in claim 19, wherein said harm-removing step contains a step of contacting the gas with a harm-removing agent comprising zeolite.

22. The method for manufacturing a semiconductor device as claimed in any one of claims 19 to 21, wherein the halogen-containing gas concentration in the gas discharged from the etching or cleaning step is 10 vol % or less.

* * * * *